Figure 1:
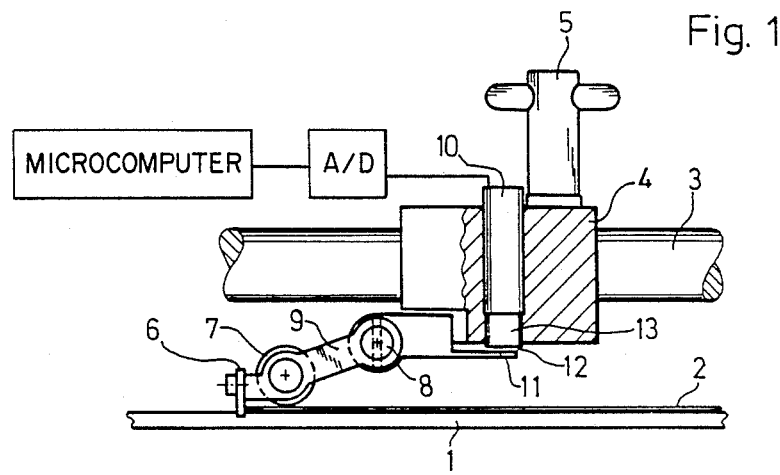

United States Patent [19]
Spiegel et al.

[11] Patent Number: 4,879,513
[45] Date of Patent: Nov. 7, 1989

[54] DEVICE FOR MEASURING PAPER OR THE LIKE LYING ON A SUPPORT

[75] Inventors: Nikolaus Spiegel, Walldorf; Karlheinz Krestyn, Leimen; Theobald Blaser, Dielheim, all of Fed. Rep. of Germany

[73] Assignee: Heidelberger Druckmaschinen AG, Heidelberg, Fed. Rep. of Germany

[21] Appl. No.: 158,230

[22] Filed: Feb. 19, 1988

[30] Foreign Application Priority Data

Feb. 19, 1987 [DE] Fed. Rep. of Germany ....... 3705304

[51] Int. Cl.⁴ .......................... B65H 7/12; G01B 7/06; G01D 3/02
[52] U.S. Cl. .................................. 324/207; 271/262; 271/263; 340/675
[58] Field of Search ................ 271/263, 262; 340/675; 355/14 SH; 324/230, 231, 207, 208; 73/159

[56] References Cited

U.S. PATENT DOCUMENTS 3,287,015 11/1966 Preuss ................................. 271/262
3,525,929 8/1970 Nounce .
4,498,240 2/1985 Van Dijk .
4,550,252 10/1985 Tee ..................................... 271/263
4,700,368 10/1987 Munn ................................. 271/263

FOREIGN PATENT DOCUMENTS 478979  1/1974 Australia .
0025976 4/1981 European Pat. Off. .
3221379 12/1983 Fed. Rep. of Germany .
3424390 2/1985 Fed. Rep. of Germany ...... 271/263
7615535 12/1976 France .
589841  7/1977 Switzerland .
1506232 4/1978 United Kingdom .
8201698 5/1982 World Int. Prop. O. .

OTHER PUBLICATIONS

Federal Republic of Germany, Publication "Elektrauik" 1970, Jun. 1, 1974 year, p.12.

Primary Examiner—Reinhard J. Eisenzopf
Assistant Examiner—Jose M. Jolis
Attorney, Agent, or Firm—Herbert L. Lerner; Laurence A. Greenberg

[57] ABSTRACT

Device and method for measuring the thickness of paper or the like lying on a support, having a pull guide arranged above the paper including a pivot bearing with a lever mounted thereon, and a pull roller located at an end of the lever and engageable with the surface of a sheet of the paper arriving on the support, the pull guide also comprising a distance measuring device for measuring a vertical movement executed by the lever and for issuing a signal in proportion with the magnitude of the distance traversed by the movement, and a device connected to the distance measuring device for electronically evaluating the signal.

9 Claims, 1 Drawing Sheet

DEVICE FOR MEASURING PAPER OR THE LIKE LYING ON A SUPPORT

This invention relates to a device for measuring paper or the like lying on a support such as a table and, more particularly, to such a device for measuring thickness of paper and which is formed of a pull guide disposed above the paper and having a lever mounted on a pivot and carrying a pull roller at an end region thereof for contacting the surface of an arrived or oncoming sheet of the paper.

In the paper processing industry, and especially in the printing industry, it is of interest to measure the thickness of the paper or sheets thereof which are being processed so as to obtain therefrom information regarding the required machine setting values. Because every sheet can have different thicknesses, it is necessary to measure the thickness of each sheet individually after it has been taken from a sheet stack and has arrived in the sheet alignment area.

In heretofore known devices of the foregoing general type, such as are known, for example, from German Published Prosecuted Application No. 32 21 379, a pivotable lever arm is mounted above a sheet alignment table and beyond or outside of the effective range of side pull guides, a roller for contacting the paper surface being provided at an end of the lever arm. A change in the thickness of the sheet causes a vertical movement of the lever arm which is then sensed by a measuring device directly connected to the lever arm.

It has been found to be disadvantageous that, in this heretoforeknown method, another direct contact with the sheet to be measured must be performed. This additional direct contact presents another possibility for damaging the surface of the paper. In general, an effort is made to avoid, as much as possible, any mechanical influences on the sheet being printed.

Therefore, it is an object of the invention to provide a device of the aforementioned general type, with which the possibility of damage to the paper surface is minimized.

With the foregoing and other objects in view, there is provided, in accordance with the invention, a device for measuring the thickness of paper or the like lying on a support, having a pull guide arranged above the paper including a pivot bearing with a lever mounted thereon, and a pull roller located at an end of the lever and engageable with the surface of a sheet of the paper arriving on the support, the pull guide also comprising distance measuring means for measuring a vertical movement executed by the lever and for issuing a signal in proportion with the magnitude of the distance traversed by the movement, and means connected to the distance measuring means for electronically evaluating the signal.

It is an advantage of this invention that the means for measuring the paper thickness is integrated within the existing pull guide. In this arrangement and construction, the pull roller, in addition to its intrinsic function of pressing down the paper, has an additional function, namely the raising or lowering of the pivotally mounted lever and the resultant sensing of the paper thickness. Therefore, the heretofore conventional device for measuring the paper thickness, which functions independently of the pull guide, can be dispensed with entirely. Besides economizing on costs for material and assembly, a critical point with respect to the possibility of damage to the sheet surface is completely eliminated. Furthermore, the pivotally mounted lever permits measuring of the most varied printing materials, because the lever engaging the paper surface through the intermediary of the pull roller adjusts itself automatically to the thicknesses of the various printing materials.

In accordance with another feature of the invention, the lever is a two-armed lever with one arm thereof being located opposite the pull roller and being formed with a tongue disposed parallel to the support, the distance measuring means being an inductive distance measuring device arranged on the pull guide above the tongue and being operatively effective in a direction towards the tongue.

This embodiment of the invention permits the use of an inductive distance transmitter with which an exact resolution of the measuring range is attainable.

In accordance with another aspect of the invention, there is provided a method of measuring the thickness of paper or the like lying on a support by means of a device having a pull guide arranged above the paper including a pivot bearing with a lever mounted thereon, and a pull roller located at an end of the lever and engageable with the surface of a sheet of the paper arriving on the support, the pull guide also having distance measuring means for measuring a vertical movement executed by the lever and for issuing a signal in proportion with the magnitude of the distance traversed by the movement, and means connected to the distance measuring means for electronically evaluating the signal, which comprises defining the position of the lever, before measurement, as a starting position for succeeding measurements.

In accordance with an additional aspect of the invention, there is provided a method of measuring the thickness of paper or the like lying on a support by means of a device having a pull guide arranged above the paper including a pivot bearing with a lever mounted thereon, and a pull roller located at an end of the lever and engageable with the surface of a sheet of the paper arriving on the support, the pull guide also having distance measuring means for measuring a vertical movement executed by the lever and for issuing a signal in proportion with the magnitude of the distance traversed by the movement, and means connected to the distance measuring means for electronically evaluating the signal, which comprises performing at least one of the steps of issuing a warning signal and stopping the machine when a given tolerance range of sheet thickness is exceeded.

In accordance with yet another aspect of the invention, there is provided a method of measuring the thickness of paper or the like lying on a support by means of a device having a pull guide arranged above the paper including a pivot bearing with a lever mounted thereon, and a pull roller located at an end of the lever and engageable with the surface of a sheet of the paper arriving on the support, the pull guide also having distance measuring means for measuring a vertical movement executed by the lever and for issuing a signal in proportion with the magnitude of the distance traversed by the movement, and means connected to the distance measuring means for electronically evaluating the signal, which comprises performing at least one of the steps of signalling the presence of multiple sheets and stopping the machine when sheet thickness measurements indicate the presence of an integral multiplicity of given sheet thicknesses.

Thus, in accordance with other features of the invention, a given lever position is defined as the starting position for any succeeding measurements in that, at the start of a production run and before the first sheet has arrived for measurement, the then existing lever position is defined as the starting position for measurement of the sheet thickness. Manual adjustment of the lever to the different sheet thicknesses can thereby be dispensed with. When a given tolerance range of paper thickness is exceeded, e.g. with the arrival of a double or multiple sheet, the electronic evaluation means can provide a control instruction for appropriate reaction.

Double or multiple sheets are instantly recognized and indicated by the electronic evaluation means due to the multiple measurement of the expected statistical sheet thickness.

Other features which are considered as characteristic for the invention are set forth in the appended claims.

Although the invention is illustrated and described herein as embodied in a device and method for measuring the thickness of paper or the like lying on a support, it is nevertheless not intended to be limited to the details shown, since various modifications and structural changes may be made therein without departing from the spirit of the invention and within the scope and range of equivalents of the claims.

Figure 2:
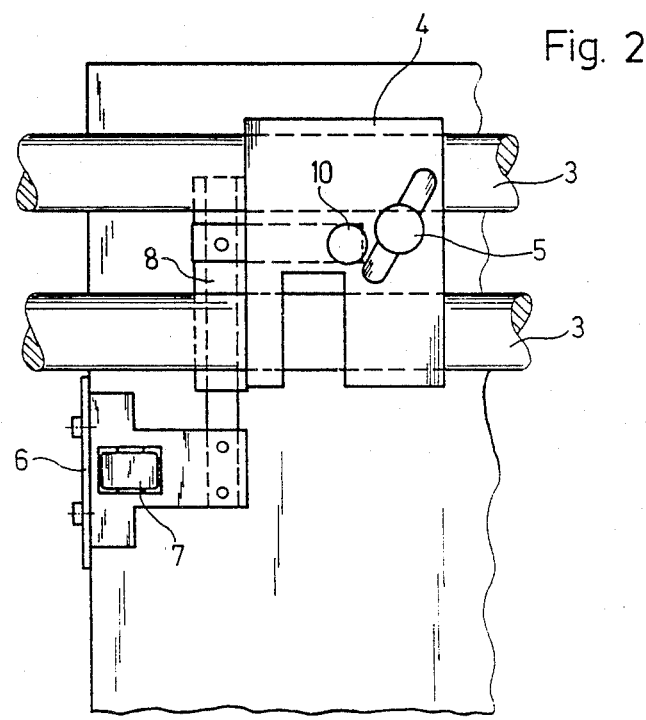

The construction and method of operation of the invention, however, together with additional objects and advantages thereof will be best understood from the following description of specific embodiments when read in connection with the accompanying drawings, in which:

FIG. 1 is a side elevational view of the invention, shown partly in section and partly broken away; and FIG. 2 is a top plan view of FIG. 1.

Referring now to the figures of the drawing, there is shown therein a base member or body 4 which is displaceably arranged on a traverse 3 extending above and along a feed table 1. A locking or setscrew 5 is provided for fastening the base member 4 on the traverse 3. At a side facing the feed table 1, the base member 4 has a pivot bearing 8 which serves for receiving a two-armed lever 9 extending parallel to the traverse 3. One arm of the two-armed lever 9 extends away from the base member 4 and is disposed at an angle to the feed table 1 in the vicinity of the pivot bearing 8. At its end, this one arm of the two-armed lever 9 is also provided with a pull or draw roller 7 which is in contact with the surface of a sheet 2 that has arrived on the feed table 1. At the end of this one arm of the two-armed lever 9, there is provided a stop 6 which aligns the arrived sheet 2. The other arm of the two-armed lever 9 which is directed towards the base member 4 is provided at its end with a tongue 11 constructed as a measuring surface which extends parallel to the surface of the feed table 1 and parallel to the base or bottom surface of the base member 4. A distance measuring device 10 is inserted perpendicularly to the tongue 11 into the base member 4 in such a way that the effective range of the distance measuring device 10 is directed towards the tongue 11. Between the tongue 11 and an end 13 of the distance measuring device 10 having the operating or effective range there exists a narrow slit 12.

A sheet 2 arriving on the feed table 1 is fed to a side alignment device and, in order not to impair the side alignment of the sheet 2, that one arm of the two-armed lever 9 which is connected to the pull or draw roller 7 is raised during the side alignment, whereby a turning movement about the pivot point of the pivot bearing 8 occurs. This turning movement about the pivot bearing 8 causes a simultaneous lowering of the other arm of the two-armed lever 9 which is provided with the tongue 11. The inductive distance measuring device 10 inserted into the base member 4 senses the degree or extent of lowering i.e. the degree or extent of widening of the slit 12 located between the tongue 11 and the effective range of the inductive distance measureing device 10. The value determined by the distance measuring device 10 is transmitted, for example, via a conventional analog-to-digital converter to a conventional microcomputer for evaluation in a well-known manner. If this value is not within the tolerance range, stoppage of the machine results and/or a warning signal is issued.

Before the first sheet 2 arrives, the position of the lever 9 is sensed or determined by the distance measuring device 10 and transmitted to the microcomputer. The transmitted measuring value is defined by the microcomputer as a reference value for the succeeding measurements. With a simultaneous arrival of a plurality of sheets 2, the slit 12 widens in proportion to the sum of the thicknesses of the plurality of sheets 2, so that the microcomputer issues a signal recognizing the presence of the multiple sheets.

We claim:

1. Device for measuring the thickness of paper lying on a support by engaging the sheet at only one location, the device having a pull guide arranged above the paper including a pivot bearing with a lever formed of two arms rigidly mounted thereon, and a pull roller located at an end of one arm of the lever and engageable at the one location with the surface of a sheet of the paper arriving on the support, the pull guide also comprising distance measuring means located at the end of the other arm of the lever for measuring a movement executed by the lever for issuing a signal in proportion with the magnitude of the distance traversed by said movement, and means connected to said distance measuring means for electronically evaluating said signal.

2. Device according to claim 1, wherein the one arm of the two-armed lever at which the pull roller is located is formed with a tongue disposed parallel to the support, said distance measuring means being an inductive distance measuring device arranged on the pull guide above the tongue and being operatively effective in a direction towards the tongue.

3. Method of measuring the thickness of paper lying on a support while engaging the sheet at only one location by means of a device having a pull guide arranged above the paper including a pivot bearing with a lever formed of two arms rigidly mounted thereon, and a pull roller located at an end of one arm of the lever and engageable at the one location with the surface of a sheet of the paper arriving on the support, the pull guide also having distance measuring means located at an end of the other arm of the lever for measuring a movement executed by the lever and for issuing a signal in proportion with the magnitude of the distance traversed by the movement, and means connected to the distance measuring means for electronically evaluating the signal, which comprises defining the position of the lever formed of the two rigidly mounted arms, before measurement, as starting position for succeeding measurements.

4. Method of measuring the thickness of paper lying on a support while engaging the sheet at only one location by means of a device having a pull guide arranged above the paper including a pivot bearing with a lever formed of two arms rigidly mounted thereon, and a pull roller located at an end of one arm of the lever and engageable at the one location with the surface of a sheet of the paper arriving on the support, the pull guide also having distance measuring means located at an end of the other arm of the lever for measuring a movement executed by the lever and for issuing a signal in proportion with the magnitude of the distance traversed by the movement, and means connected to the distance measuring means for electronically evaluating the signal, which comprises performing at least one of the steps of issuing a warning signal and stopping the machine when a given tolerance range of sheet thickness is exceeded.

5. Method of measuring the thickness of paper lying on a support while engaging the sheet at only one location by means of a device having a pull guide arranged above the paper including a pivot bearing with a lever formed of two arms rigidly mounted thereon, and a pull roller located at an end one arm of of the lever and engageable at the one location with the surface of a sheet of the paper arriving on the support, the pull guide also having distance measuring means located at an end of the other arm of the lever for measuring a movement executed by the lever and for issuing a signal in proportion with the magnitude of the distance traversed by the movement, and means connected to the distance measuring means for electronically evaluating the signal, which comprises performing at least one of the steps of signalling the prsence of multiple sheets and stopping the machine when sheet thickness measurements indicate the presence of an integral multiplicity of given sheet thicknesses.

6. Method of measuring the thickness of paper lying on a support while engaging the sheet at only one location by means of a device having a pull guide arranged above the paper including a pivot bearing with a lever formed of two arms rigidly mounted thereon, and a pull roller located at an end of one arm of the lever and engageable at the one location with the surface of a sheet of the paper arriving on the support, the pull guide also having distance measuring means located at an end of the other arm of the lever for measuring a movement executed by the lever and for issuing a signal in proportion with the magnitude of the distance traversed by the movement, and means connected to the distance measuring means for electronically evaluating the signal, which comprises performing the step of issuing a warning signal when a given tolerance range of sheet thickness is exceeded.

7. Method of measuring the thickness of paper lying on a support while engaging the sheet at only one location by means of a device having a pull guide arranged above the paper including a pivot bearing with a lever formed of two arms rigidly mounted thereon, and a pull roller located at an end of one arm of the lever and engageable at the one location with the surface of a sheet of the paper arriving on the support, the pull guide also having distance measuring means located at an end of the other arm of the lever for measuring a movement executed by the lever and for issuing a signal in proportion with the magnitude of the distance traversed by the movement, and means connected to the distance measuring means for electronically evaluating the signal, which comprises performing the step of stopping the machine when a given tolerance range of sheet thickness is exceeded.

8. Method of measuring the thickness of paper lying on a support while engaging the sheet at only one location by means of a device having a pull guide arranged above the paper including a pivot bearing with a lever formed of two arms rigidly mounted thereon, and a pull roller located at an end of one arm of the lever and engageable at the one location with the surface of a sheet of the paper arriving on the support, the pull guide also having distance measuring means located at an end of the other arm of the lever for measuring a movement executed by the lever and for issuing a signal in proportion with the magnitude of the distance traversed by the movement, and means connected to the distance measuring means foe electronically evaluating the signal, which comprises performing the step of signalling the presence of multiple sheets when sheet thickness measurements indicate the presence of an integral multiplicity of given sheet thicknesses.

9. Method of measuring the thickness of paper lying on a support while engaging the sheet at only one location by means of a device having a pull guide arranged above the paper including a pivot bearing with a lever formed of two arms rigidly mounted thereon, and a pull roller located at an end of one arm of the lever and engageable at the one location with the surface of a sheet of the paper arriving on the support, the pull guide also having distance measuring means located at an end of the other arm of the lever for measuring a movement executed by the lever and for issuing a signal in proportion with the magnitude of the distance traversed by the movement, and means connected to the distance measuring means for electronically evaluating the signal, which comprises performing the step of stopping the machine when sheet thickness measurements indicate the presence of an integral multiplicity of given sheet thicknesses.

* * * * *